United States Patent [19]

Klinner et al.

[11] Patent Number: 4,788,901
[45] Date of Patent: Dec. 6, 1988

[54] DEAD ENDED SQUARE BALER

[75] Inventors: Wilfred E. Klinner, Milton Keynes; Anthony J. Goff, Essex, both of England

[73] Assignee: National Research Development Corporation, London, England

[21] Appl. No.: 844,162

[22] Filed: Dec. 26, 1986

[30] Foreign Application Priority Data

Mar. 27, 1985 [GB] United Kingdom ................ 8508004

[51] Int. Cl.⁴ ............................................. B65B 13/20
[52] U.S. Cl. .................................. 100/188 R; 100/192
[58] Field of Search ............... 100/189, 142, 191, 185, 100/3, 188 R, 192; 56/341

[56] References Cited

U.S. PATENT DOCUMENTS

| | | | |
|---|---|---|---|
| 716,422 | 12/1902 | Hulscher | 100/179 |
| 1,234,078 | 7/1917 | Pate | 100/179 |
| 1,588,681 | 6/1926 | Haney | 100/189 X |
| 2,595,503 | 5/1952 | Altgelt | 100/179 X |
| 4,150,613 | 4/1979 | Smee et al. | 100/3 |
| 4,172,414 | 10/1979 | Klinner et al. | 100/4 |
| 4,184,312 | 1/1980 | Oosterling et al. | 100/189 X |
| 4,644,739 | 2/1987 | Robb | 100/188 R |

FOREIGN PATENT DOCUMENTS

| | | |
|---|---|---|
| 537393 | 1/1981 | Australia . |
| 588850 | 11/1933 | Fed. Rep. of Germany . |
| 1577260 | 4/1970 | Fed. Rep. of Germany . |
| 2443085 | 3/1976 | Fed. Rep. of Germany . |
| 2617183 | 11/1977 | Fed. Rep. of Germany . |
| 2254272 | 7/1975 | France . |
| 2423400 | 11/1979 | France . |
| 2550912 | 10/1984 | France . |
| 972562 | 10/1962 | United Kingdom . |
| 910167 | 11/1962 | United Kingdom . |
| 954580 | 4/1964 | United Kingdom . |
| 1384045 | 2/1975 | United Kingdom . |
| 1576713 | 10/1980 | United Kingdom . |
| 1591828 | 6/1981 | United Kingdom . |
| 1591829 | 6/1981 | United Kingdom . |
| 1600195 | 10/1981 | United Kingdom . |

Primary Examiner—Stephen J. Novosad
Assistant Examiner—Matthew Smith
Attorney, Agent, or Firm—Cushman, Darby & Cushman

[57] ABSTRACT

A dead-ended baler in which the bale chamber diverges in the overall direction of crop flow through the chamber, the overall divergence of the rear section of the bale chamber preferably being greater than the overall divergence of the preceding section of the bale chamber.

7 Claims, 9 Drawing Sheets

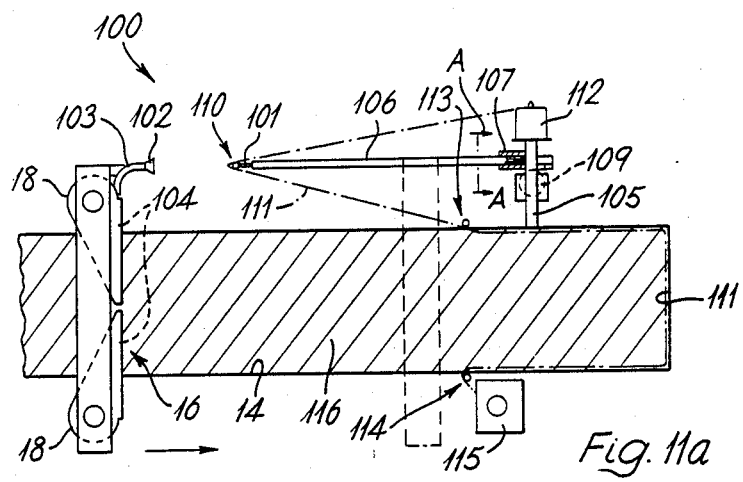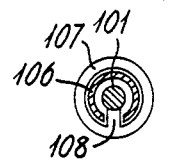
Fig. 11b
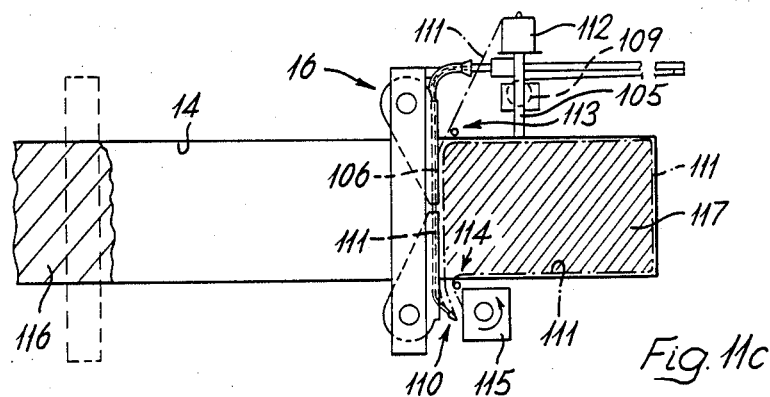
Fig. 11c
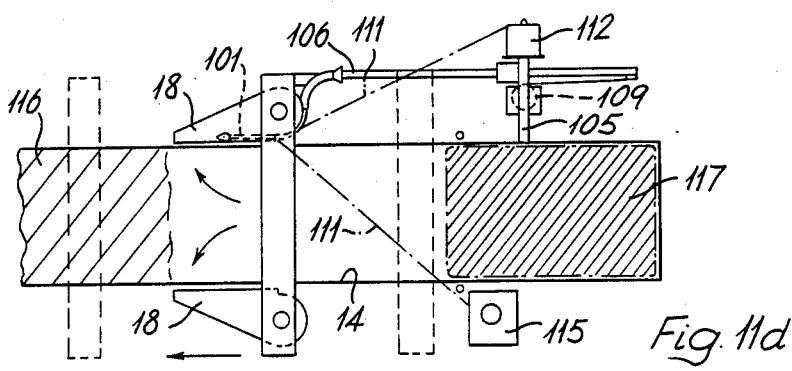
Fig. 11d

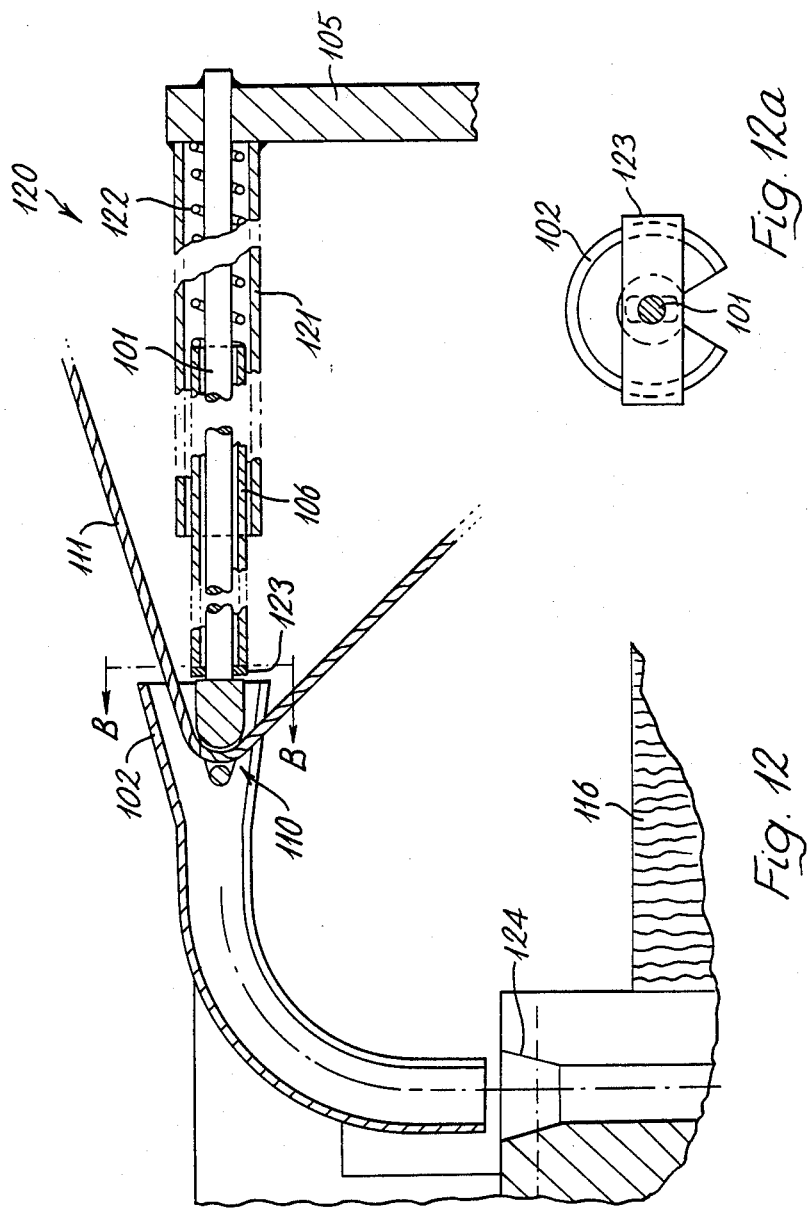

DEAD ENDED SQUARE BALER

The present invention relates to dead-ended balers, i.e. to balers with closed-ended bale chambers.

Dead-ended balers have been used for industrial purposes as static machines for many years and are more recently being adapted in mobile form for agricultural purposes. One such example is disclosed in UK patent specification No. 1,567,177 (NRDC).

In known balers of this type, the walls of the bale chamber are either parallel sided or they converge in at least one plane in the direction in which the material is to be compressed and fed into the baling chamber. In both cases, under the influence of compressive forces applied longitudinally from the feed end of the bale chamber, some of the material in the chamber is displaced laterally and as a result high wall friction and consequently increased resistance to compaction occurs. This reduces the effectiveness of the machine.

A second drawback of existing balers of this type is that the bale, once made and tied, tends to become tightly wedged in the high-density downstream section of the bale chamber, and extraction of the bale can be difficult and power demanding, often requiring a special extraction mechanism to be provided. Opening the base of the bale chamber so that the bale falls out by gravity is a convenient approach to the problem of bale release and in UK patent specification No. 1,572,935, UK Pat. No. 2,035,199B and UK patent application No. 2,089,287A, for example, there are disclosed balers in which the bale chamber end plate is joined to part of the base plate by a horizontal transverse hinge at the top of the end plate. However, the system of UK patent specification No. 1,572,935 has the disadvantage that, especially when accumulating two or more bales into a handling unit of more than one bale high, the opened bale chamber section constitutes an obstruction in the rearward direction. In the machines of UK Pat. No. 2,035,199B and UK patent application No. 2,089,287A, the ground clearance is substantially greater, and a tiltable portion of the upper bale chamber wall, upstream of the hinge, pivots with the end wall and lower wall section, to dislodge the bale from its position after tying. These last two machines are subject to the disadvantage, however, that they cause the released bale to make contact with the ground initially at one end, and this can lead to bale distortion at some densities.

Objectives of the present invention are to save energy during compaction by minimising wall friction and re-expansion or 'spring-back' of material in the bale chamber during the compression process, to facilitate extraction of bales made in the chamber by simple means an in such a way that the effective ground clearance under the rear portion of the bale chamber remains unobstructed for the uninterrupted rearward passage of baled material, to avoid bale distortion, and to provide a simplified and dynamically more favourable tying system than is currently available.

According to the present invention, a dead-ended baler comprises a bale chamber which diverges in the overall direction of the crop flow through the chamber.

Conveniently, the overall divergence of the rear section of the bale chamber differs from the overall divergence of the preceding section of the bale chamber.

Conveniently, the overall divergence of the rear section of the bale chamber is greater than the overall divergence of the preceding section of the bale chamber.

Conveniently, at least the rear section of the bale chamber has an overall vertical divergence towards the bottom of the chamber.

In an alternative embodiment, the rear section of the bale chamber has no overall divergence.

In a further alternative embodiment, it is the front section of the bale chamber that has no overall divergence. This latter design is likely to have particular application where a relatively low final density is required.

According to a preferred feature, the baler has crop-engaging projections extending into the bale chamber and shaped and/or mounted to facilitate movement of the crop in the overall direction of crop flow through the chamber but to resist movement of the crop in the opposite direction.

Preferably, the crop-engaging projections are provided by rearwardly-angled transverse and/or vertical fins and/or by equivalently shaped and disposed ribs and/or teeth.

Conveniently, the fins, ribs or teeth are fixedly located within the bale chamber.

Alternatively, the fins, ribs or teeth may be fitted to hinged and/or spring-loaded false walls and/or bars or like false boundary means within the bale chamber.

In one such embodiment, the supports provided by the false walls and/or bars or the like within the bale chamber are linked to a crop-feed-related drive in such a way as to at least in part retract when a new charge is introduced into the chamber and to be urged inwardly at all other times.

Conveniently, in this case, only the upstream ends of the supports retract when the new charge is introduced. Alternatively, however, both ends of the supports may retract when the new charge is introduced or the upstream ends of the supports may retract when the new charge is introduced and the downstream ends of the supports may be urged further into the crop stream.

Conveniently, at least the majority of the crop-engaging projections are located in the upstream section of the bale chamber.

Conveniently, the floor of the downstream section of the bale chamber includes one or more base plates adapted in operation to swing outwardly from the bale chamber to provide a discharge port for the bale formed in the chamber.

Conveniently, the floor of the downstream section of the bale chamber is split longitudinally into two base plates each attached by a longitudinal hinge to the adjacent fixed side of the chamber.

Alternatively, the floor of the downstream section of the bale chamber is split longitudinally into two base plates and adjacent side plates of the chamber are longitudinally hinged to a top plate of the chamber and to adjacent ones of said two base plates.

In this case, the moving plates are conveniently opened and closed by at least one pair of hydraulically actuated locking clamps.

In another embodiment, there is a single said base plate rigidly connected with a first side plate of the chamber, the second side plate of the chamber is rigidly connected with the top plate of the chamber, and the first side plate is longitudinally hinged to the top plate.

Conveniently, in this case, the baler includes hydraulic drive means for opening and closing the moving plates and additional means are provided for supporting the end plate of the bale chamber when this is in its closed position.

Conveniently, adjacent edge regions of the base plate and the second side plate interlock with one another when these two plates are closed together.

In yet another embodiment, the floor of the downstream section of the bale chamber is split longitudinally into two base plates and each plate is rigidly attached to the adjacent side plate of the chamber, the two side plates being longitudinally hinged to a top plate of the chamber.

In this case, the two side plates conveniently have vertical extensions and one or more hydraulic rams act between these two extensions, additional means being provided for supporting the end plate of the bale chamber when this is in its closed position.

According to a preferred feature, the bale chamber rear wall is hingedly attached at the rear edge of the roof structure and is lockable in position by one or more side walls and/or base plates of the chamber.

Conveniently, said rear wall also provides forming stops for the side walls and base plates, which stops can pivot rearwards when released to allow the made bale to fall to the ground without binding.

According to an optional feature of the invention, the baler may include a discharge arrangement which results in a bale made within the chamber being deposited on its side.

According to another optional feature, a plunger is located in the roof of the bale chamber and is operable to dislodge a bale made within the chamber from any binding contact present with the bale chamber walls.

Conveniently, in this case the plunger is mushroom-shaped.

Conveniently, the plunger is operated in response to movement of any part of the bale chamber or by the opening and closing mechanism for these parts.

According to another aspect of the invention, there is provided a baler comprising a flexible twine needle. Conveniently, the baler is one according to the present invention.

Conveniently, the twine needle is supported in a rearwardly displaceable guide and support means which may, if desired, be spring-loaded.

Conveniently, the guide and support means takes the form of a shroud although other forms are possible.

Conveniently, the baler comprises a twine guide system incorporated in the leading region of an advancing crop-compacting device, with slots throughout the length of the guide system to allow the twine to escape as the crop-compacting device recedes.

Conveniently, the crop-compacting device is formed by compression members moved into their operative positions.

Alternatively, the baler may comprise a twine guide system which is permanently incorporated in a compression head providing the crop-compacting device.

Conveniently, the baler comprises a rearwardly-facing guide funnel carried by the carriage of the crop-compacting device and, incorporated in the carriage, a guide duct radiused through 90° and leading into a guide channel at the operative face of the crop-compacting device.

Conveniently, in its inoperative position, the flexible needle points forwardly from a support incapsulated in the guide and support means.

Conveniently, in this latter case where the guide and support means comprises a shroud, the shroud is split longitudinally and supported in a cylindrical guide and intruding through the slit at the support region of the shroud, the guide presents a fin to which the rear end of the flexible needle is secured.

Conveniently, the rear end of the shroud is attached to one end of a coiled-band tension spring.

Conveniently, the path for the twine used for tying the bale runs from a twine ball, through the eye of the flexible needle, under a rotary guide, around the inside of the rear section of the bale chamber where it is held in position by the contents of the chamber and over another rotary guide to the retainer in a knotter.

Conveniently, the baler uses a single-stroke crop-compacting device. As an alternative, however, it may comprise a multi-stroke crop-compacting device in which a support carrying the flexible needle is pivotable in the horizontal or vertical plane to align with a guide funnel only during the final bale-forming stroke.

Conveniently, in this latter case, the twine guide in the crop-compacting device is smoothly curved.

Conveniently, in the multi-stroke version, the stroke length of the crop-compacting device is at least equal to the distance the needle head has to travel to deliver the twine to a knotter.

Conveniently, the twine needle assemblies are positioned on top of the baler. However with some reciprocating-piston balers, it may be preferable to position the twine needle assemblies beneath the bale chamber with the knotters and the twine box on top.

It is to be noted that the twine supply need not be positioned where the needle assemblies are.

Embodiments of the invention will now be described, by way of example only, with reference to the accompanying drawings, in which:

FIG. 9b shows in cross-section a modified version of the design of FIG. 9a;

FIGS. 11a, 11c and 11d are three simplified side views, partly in section, of a bale-tying system for use in the baler while FIG. 11b is a view of the needle arrangement taken along line A—A in FIG. 11a;

FIG. 12 shows on an enlarged scale a vertical section of part of an alternative bale-tying system;

FIG. 12a is an end view looking along the line BB in FIG. 12; and

FIGS. 13a, 13b and 13d are three simplified side views, partly in section, of a bale-tying system for use in the baler while

Figure 1:
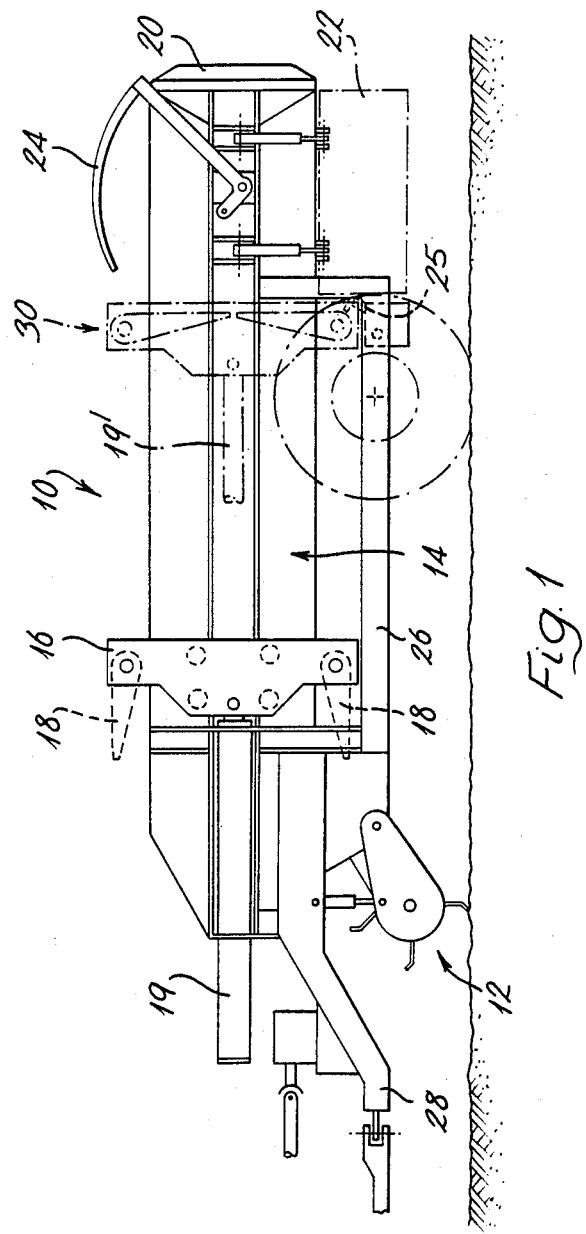
FIG. 1 is a general side view of a baler in accordance with the present invention.

Thus referring first to FIG. 1 of the drawings, this shows a mobile, dead-ended baler 10 suitable for use with agricultural crops.

The baler 10 comprises a pick-up 12 for collecting crop from the field and a conventional baler feed system (not shown) which transfers the collected material from the pick-up through a duct into the low-density section of the bale chamber 14.

Reference numeral 16 indicates an open-centred carriage which embraces the bale chamber. At its upper and lower ends, the carriage carries two sets of pivoted crop cleavers 18. During filling, the cleavers 18 are held clear of the chamber 14 as shown on the left-hand side of the Figure. When the cleavers 18 are swung into the bale chamber from above and below, however, they will co-operate to form a crop-compacting piston device similar to that disclosed in UK Pat. No. 1,567,177.

The piston device so formed is powered by two horizontal hydraulic rams shown at 19 and 19' attached at the front to the sides of the bale chamber and, at the rear, to the chamber-embracing carriage 16. In this way, the rams operate in compression, which is an alternative to the tension system shown in UK patent specification No. 1,567,177. The main valve in the hydraulic supply to the rams is controlled from an appropriate pressure sensor attached either to a pivoted end plate 20 or in the drive to the feed mechanism.

The baling arrangement is completed by a pivoted end plate 20 and by rear base plates 22 shown in broken line in their open position. Needles 24 and knotters 25 are included for tying the bales made in the chamber.

Reference numeral 26 indicates the supporting frame of the machine which can be connected to a tractor hitch by a swan-neck drawbar 28. In use, the mechanical and hydraulic drives for the baler are operated from the tractor power take-off.

In operation of the baler, crop delivered by the feed system into the bale chamber 14 is progressively moved along by the feed system until the whole of the bale chamber is filled and the crop column density has built up to a pre-determined level.

At this stage, a crop pressure sensor signals that the pre-compaction process is complete and this trips the main hydraulic valve to force oil into the rams lying alongside the bale chamber.

As the rams extend they force the carriage 16 towards the rear of the bale chamber. The cleavers 18 are automatically swung into the bale chamber either before, or as soon as, the carriage begins to move, to form the piston device (30) referred to earlier.

The moving piston device continues to compress the crop in chamber 14 until the carriage has reached the end of its travel (illustrated in broken line at the right hand side of the Figure) and then the tying cycle takes place.

Once the bale has been tied, the end plate 20 is swung open to allow the bale to eject. If desired, the base plates 22 may also be swung down as indicated to facilitate bale ejection by opening the whole of the rear section of the bale chamber.

Figure 2A:
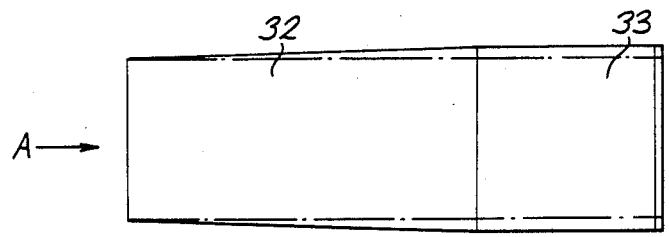
FIGS. 2a and 2b are plan and end views of one form of bale chamber for use in the baler of FIG. 1.
Figure 2B:
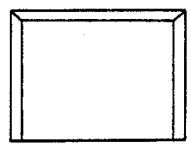

Turning now to FIG. 2a, this shows in plan view, a bale chamber having a low-density section 32 which diverges in accordance with the invention in the direction of crop flow and a high-density rear section 33 which is parallel-sided. FIG. 2b is an end view in the direction of arrow A in FIG. 2a. It should be noted that in relation to the flat floor of the bale chamber, the roof section is also diverging vertically, but optionally a yet further possibility is for the floor to diverge vertically also.

Figure 3A:
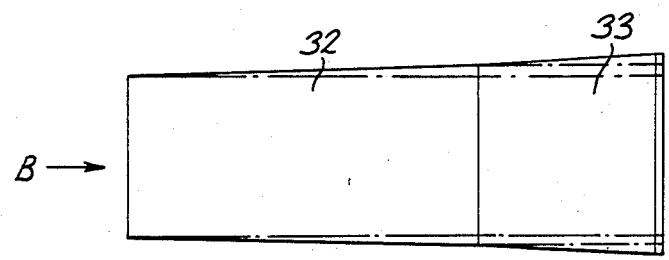
FIGS. 3a and 3b are plan and end views of an alternative design of suitable bale chamber.
Figure 3B:
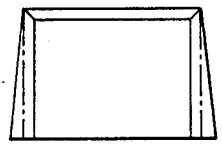

FIG. 3a is a plan view of a bale chamber 14 in which the side walls diverge uniformly throughout the low-density and high-density sections 32, 33. FIG. 3b is an end view in the direction of arrow B, showing an alternative arrangement in which the sides of the low-density and/or high-density sections of the bale chamber may optionally diverge also from the roof of the chamber towards the floor. It is this latter feature which greatly facilitates extraction downwardly of the made bale.

Figure 4:
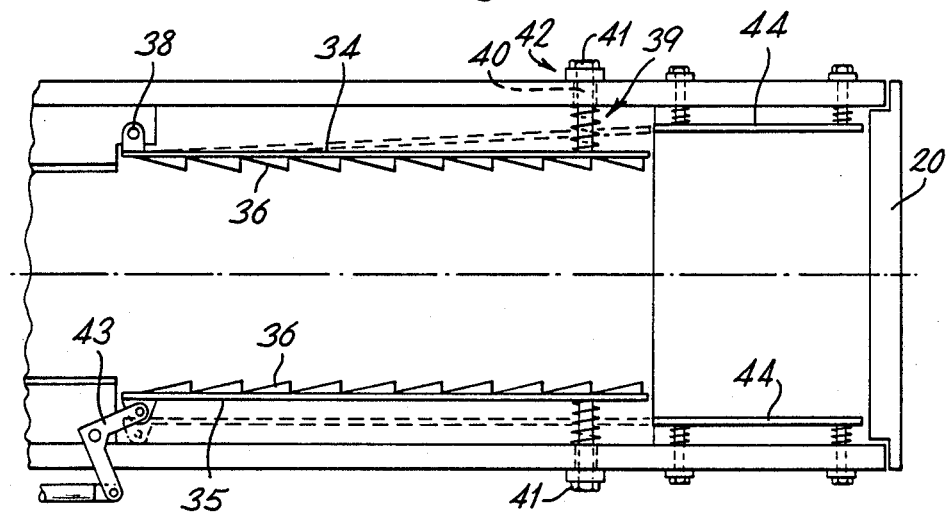
FIG. 4 is a plan view of a bale chamber with the upper wall removed to reveal the interior of the bale chamber.

FIG. 4 shows in side and/or plan view two methods by which diverging crop-engaging wall or closely spaced bar members 34, 35 of a low-density bale chamber section may be provided with teeth or toothed ribs 36 so shaped and mounted that crop can slide over them easily in the direction of overall flow but is prevented from springing back by the edges and perpendicular faces of the teeth shown.

Thus in the upper half of FIG. 4, the crop-engaging member 34 is shown to be hinged at the upstream end 38 and supported by springs 39 at the downstream end. To hold the downstream end in position, a dowel 40 may pass through the centre of the coil spring and through a hole in the outer bale chamber wall or cage member. A stop 41, which may be adjustable, at the outer end of the dowel limits the depth of intrusion of the ribs 36 into the bale chamber. A resilient collar 42 under the limit stop minimises wear and operating noise. In place of the hinge 38 shown at the upstream end, further spring supports may be fitted, and there may be differences in the spring rating between ends. Instead of coil springs 39, leaf springs, resilient blocks or other spring means may be used instead if desired.

In the alternative arrangement shown in the lower half of FIG. 4, the crop-engaging member 35 is again shown to be spring-loaded at the downstream end. However, at the upstream end it is hingedly attached to a rocker arm 43 which can be actuated, for example by linking it to the feed mechanism, so that the clearance across the crop flow passage is maximised whenever a new charge is forced into the chamber. When the feed mechanism retracts, the crop-engaging member is forced by the rocker arm 43 against the charge in the bale chamber.

In a variation of this latter arrangement, both ends of the crop-engaging member 35 may be mounted on rocker arms and linked in the way described above to the feed mechanism or a feed-related drive component. Optionally, the linking may be so devised that the upstream end of the crop-engaging wall or member is in the opposite position to the downstream end.

In both the designs of bale chamber shown in FIG. 4, the high-density section of the bale chamber is shown to be lined on at least two sides by spring-loaded plates 44. However, in alternative arrangements (not shown) the chamber walls are instead solid or serrated and the multiple spring-loaded crop-engaging members 34, 35 extend throughout the bale chamber up to the end door 20. Optionally, in this latter case, the design of the crop-engaging teeth on the extended members 34, 35 may differ in the two sections of the bale chamber. As a further option, the spring pressure urging the serration-carrying walls or bars towards the centre of the bale chamber may be adjustable.

Figure 5:
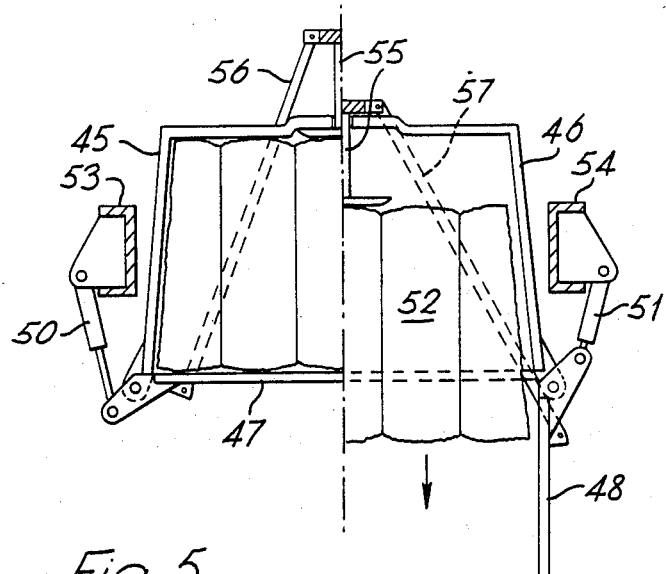
FIGS. 5 and 6 are cross-sections of alternative designs of openable end portions of the bale chamber for use in the baler.

FIG. 5 is a cross-sectional downstream view of the high-density section of a bale chamber which has downwardly diverging side walls 45, 46. Attached by horizontal longitudinal hinges to the lower ends of the side walls are half-width 'bomb' doors 47, 48. Although these will normally open and close together, FIG. 5 is a split view in which one door 47 is closed in the left-hand half and the other door 48 is open in the right-hand half.

By opening both doors to the position shown for door 48 (for example by the hydraulic rams 50, 51 shown attached to the frame members 53, 54), the made bale 52 is able to fall unobstructed to the ground.

Optionally, there may be provided under the top plate of the bale chamber a plunger 55 with mushroom-shaped head and its stem protruding through the roof plate. Optionally also the plunger may be connected by link arms 56, 57 behind the end plate to the bomb doors, so that, on opening the doors, a downward force is automatically applied to the plunger stem. Because FIG. 5 illustrates two alternative situations, only the right-hand half of the plunger is shown depressed to positively dislodge the bale from the bale chamber. This feature is of special importance in association with bale chambers not flared outwardly from top to bottom, e.g. the design shown in FIGS. 2a and 2b.

Figure 6:
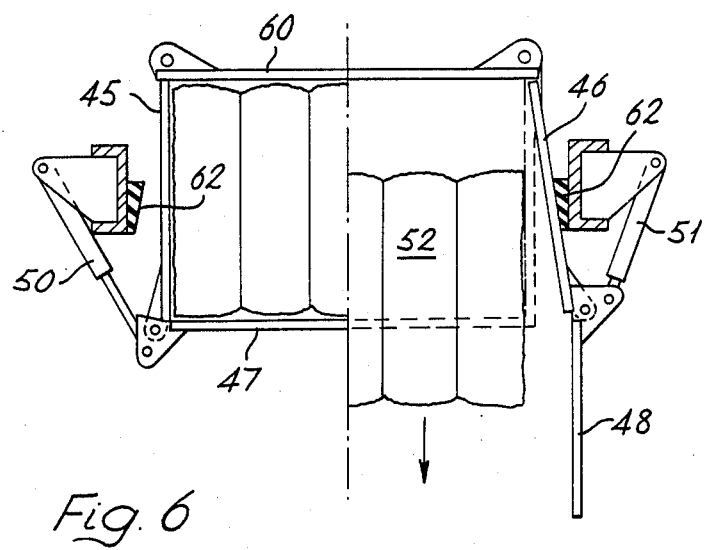

FIG. 6 shows a variation on the arrangement disclosed in FIG. 5 and once again two situations are illustrated in exactly the same way as in that earlier Figure. Thus referring now to FIG. 6, it will be seen that in addition to the half-width bomb doors 47, 48 being hingedly attached to the side walls 45, 46 of the bale chamber, the side walls are also hingedly attached to the roof section 60 of the high-density part of the bale chamber. On contracting, the hydraulic ram 50 shown in the left-hand half of FIG. 6 pulls the side wall 45 outwardly against resilient stop 62 and also opens the bomb door 47. As a result the bale is again free to fall to the ground, as is shown in the right-hand of FIG. 6 for elements 46, 48.

Figure 7A:
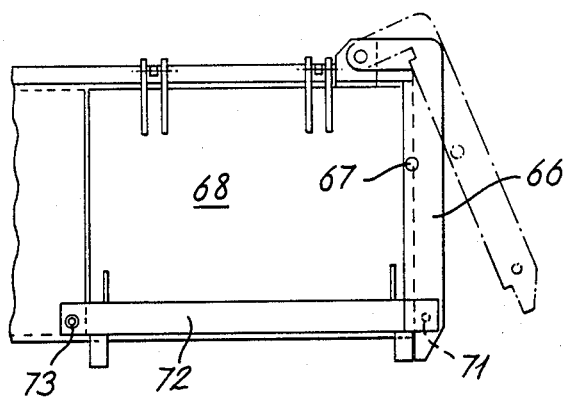
FIGS. 7a and 7b are scrap side and end views taken at the rear of a further design of bale chamber.
Figure 7B:
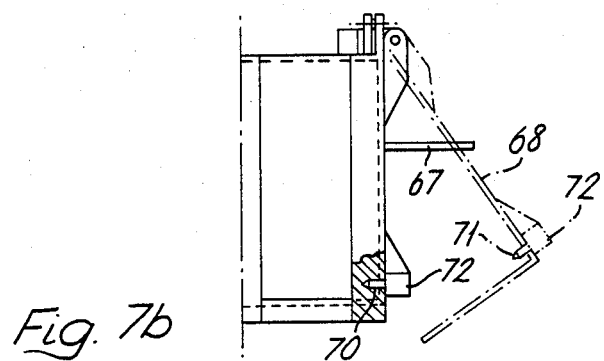

It should be noted that in the embodiment of FIGS. 5 and 6, the rear wall of the bale chamber remains in a fixed position. FIGS. 7a and 7b show an alternative arrangement, however, in which the rear wall is provided by a reinforced door 66 which is so hinged at the top to the roof section that it will close fully, even if the baler is operating on an uphill slope.

Near the centre of the door, laterally extending bars 67 are of sufficient length to engage the rear edge, at least on one side, of the combined bomb door and side walls 68 whether closed as shown in full lines in FIGS. 7a and 7b or open as shown in broken lines in FIG. 7b only. This prevents the door from swinging too far forward, should the baler be working downhill.

A suitable aperture 70 in each side of the lower door structure is provided to accommodate strong spigots 71. These are attached to short extensions of strengthening and load-transfer members 72 attached to the lower side walls. Similar extensions 73 of the same members at the upstream ends of the side walls have apertures which engage with spigots which are suitably secured to support the tensile loads transmitted throughout the members during compression.

The interlocking spigots prevent the rear door from being pushed open by straw pressure during compaction. However, once the bale has been formed in the chamber and tied by the knotting mechanism, withdrawal of members 68 to the position shown in FIG. 7b removes the interlocking spigots 71 attached to the combined bomb doors and side plates so that the rear wall becomes free to swing open at the base sufficiently to allow the made bale to fall to the ground. Once the chamber is empty, the rear wall returns to its normal position and becomes the downstream stop, or former, for the other hinged bale chamber defining plates. Upstream, appropriate stops are provided at the end of the low-density section of the bale chamber.

Figure 8:
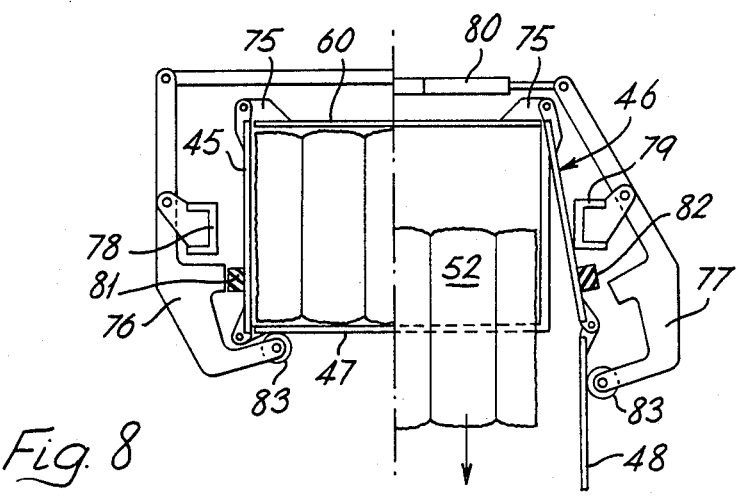
FIGS. 8 and 9a are cross-sections of further designs of openable end portions of the bale chamber for use in the baler.

FIG. 8 shows in split cross-sectional view the high-density section of a baler in which the side plates 45, 46 are attached to the sides of the roof structure 60 by longitudinal hinges 75, and similarly hingedly attached to the lower edges of the side plates are the half-chamber width bomb doors 47, 48. At least one pair of clamping lock arms 76, 77 are hingedly attached to the side rails 78, 79 of the baler frame in such a way that, when the cantilevered upper ends are forced apart by a hydraulic ram 80, the double-hinged open sides are brought together against vertical stops 81, 82 at or above the level of the lower hinges, and the bomb doors 47, 48 are closed. Rollers 83 at the lower ends of the clamp arms minimise friction and wear while the resilience of the stops 81, 82 ensures quiet operation and firm closing of the chamber but with a small degree of lateral 'give' provided.

As with FIGS. 5 and 6, the left-hand side of FIG. 8 shows the structure closed while on release of the clamp arms 76, 77 the bale falls to the ground unassisted, as indicated on the right-hand side of FIG. 8 where the structure is shown in its open position. The rear wall arrangements may be as described for FIG. 6.

Figure 9A:
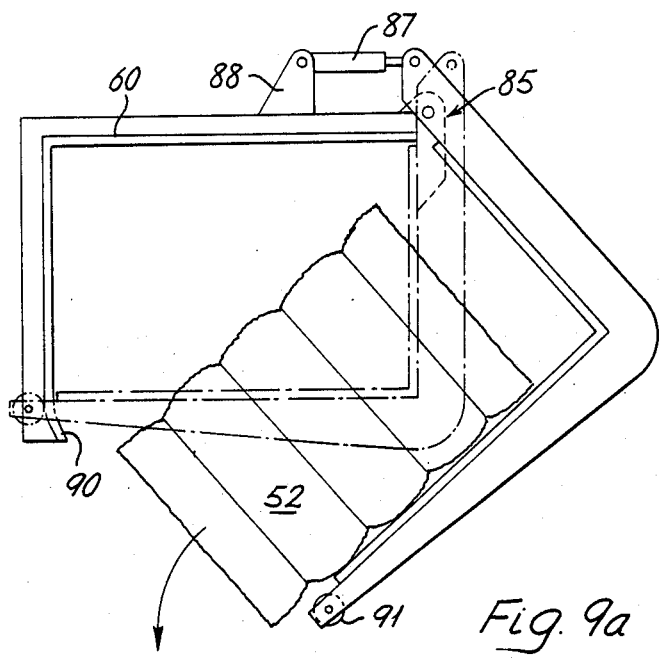

FIG. 9a shows in cross-sectional rear view two divided halves of the high-density section of the bale chamber attached to each other by a longitudinal hinge 85 at the top right-hand edge of the roof structure. Attached to the cantilevered section of the right-hand side plate is a small hydraulic ram 87 supported from a bracket 88 on the roof structure 60. When the ram is extended, the two halves of the chamber are brought together.

Angled or curved prongs 90 at the bottom of the left-hand side plate register with slots (not shown) opposite in the base plate, to achieve an interlocking effect. Optionally there may be provided rollers 91 or curved guide plates near the outer edge of the base plate, to give a lead-in effect for the prongs and minimise friction and wear. The prong extensions of the side plate may be shaped so that a degree of positive locking is achieved behind, i.e. underneath the rollers 91, which may be readily overcome by the hydraulic force applied to open the chamber. Movement of the hinged section may be limited by a stop on the ram 87 so that the made bale is deposited on the ground resting on its side. This can facilitate handling, protects the twines and minimises the amount of precipitation absorbed by the bale.

The arrangement shown in FIG. 9a requires the end plate of the bale chamber to remain attached to the static section or to form part of the pivoted portion. In either case the two sides of the end plate which are unsupported when the chamber is open need to be supported when closed. Of the many possible ways of achieving this, one preferred approach is to provide a gusset plate linking the two walls opposite the corner of the end plate which is unsupported when the chamber is open. The gusset is slightly flared rearwardly so that, on closing, the end plate slides in front of it and becomes supported along the two detached sides. Alternatively the end plate may be diagonally split and a diagonal strengthening member fitted to one half in such a way that in the closed position the other half is also diagonally supported by the member. Yet a further alternative is to arrange for the end plate to be pivotted at the top, as described in respect of FIG. 7a.

Figure 9B:
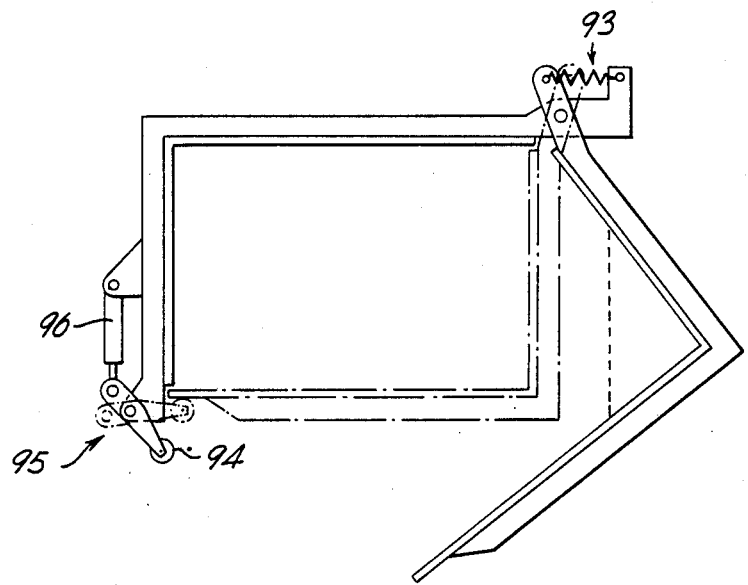

An arrangement similar to that shown in FIG. 9a is disclosed in FIG. 9b. In this case, instead of being hydraulically actuated, the hinged section of the bale chamber is counter-balanced by any convenient spring means 93 so that it is forced open by the weight of the made bale when the locking mechanism is released and shuts closed after the bale has slid off. A roller 94 on the locking latch 95 minimises wear when the chamber opens. Although the locking latch is shown to be hydraulically actuated in FIG. 9b by ram 96, mechanical locking mechanisms are also suitable.

Figure 10:
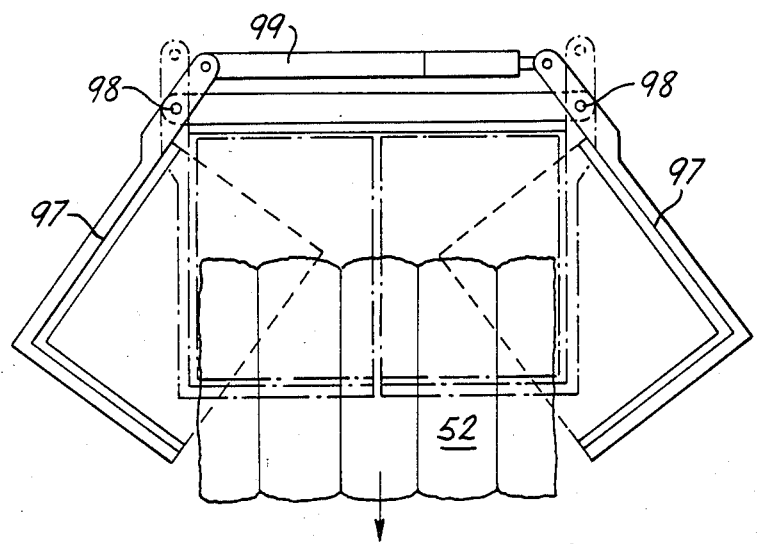
FIGS. 10, 10a and 10b are cross-sections of another design of bale chamber at different stages of operation, FIGS. 10a and 10b being drawn to a smaller scale than FIG. 10.

FIG. 10 shows a cross-sectional rear view of the high-density section of the bale chamber in which each combined side plate and half base plate 97 in the normal fixed relationship is attached by longitudinal hinges 98 on each side of the roof structure. Upward extensions of the side plates may be linked by a hydraulic ram, as in FIG. 10, to perform the opening and closing actions. With this arrangement the end plate may be split vertically along its centre line, as shown, and in the closed position the upper edges are supported behind them by a transverse strengthening member protruding downwardly from the roof structure at the rear.

Figure 10A:
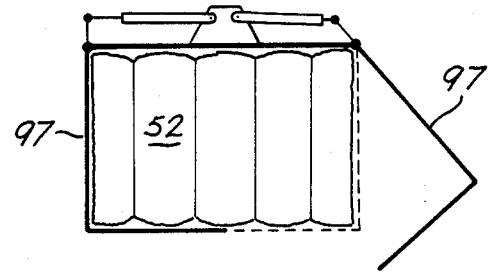
Figure 10B:
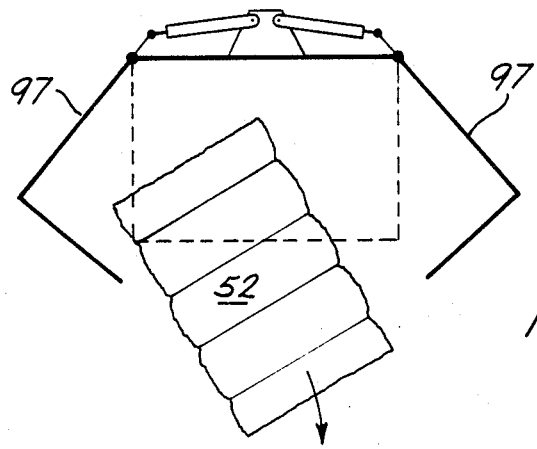

In FIG. 10 a single linking ram 99 is shown to open the two halves of the bale chamber simultaneously so that the bale falls vertically down and comes to rest on the ground in the position in which it was made. Alternatively, two rams may be provided to actuate each opening portion of the bale chamber separately. Then, if the ram action is phased, as illustrated on a reduced scale in FIGS. 10a and 10b, the bale can be released so that it comes to rest on the ground on one of its sides. The advantages of this have been described earlier.

It should be noted that the bale discharge arrangements shown in FIGS. 5–10b require bale tying arrangements which differ from those currently in use. At the very least, the twine needles and actuating arrangement need to be accommodated clear of the opening part of the chamber and the knotters beneath it. Moreover, they are not suitable if any of the spring-back-preventing fitments disclosed in FIG. 4 extend into the high-density section of the bale chamber.

As already mentioned in the description, unconventional arrangements of the twine threading mechanism are required. The knotters will be attached to the base plate outside the chamber just upstream of the hinged wall sections. It should be noted that the principle of the laterally opening bale chamber with hinged rear door may be put into effect in several alternative ways.

Referring now to FIGS. 11a, 11c and 11d, these disclose, at three different stages of operation, an automatic bale tying system 100 employing a flexible twine rod or needle 101, a rearwardly-facing guide funnel 102 at the top of the carriage frame and, incorporated in the carriage, a guide duct 103 radiused through 90° and leading into a guide channel 104 between the two closely spaced plates of each compression arm 18.

The flexible needle 101 points forwardly from a post or transverse frame support 105 encapsulated in a tube or shroud 106 which is split longitudinally and supported in a cylindrical guide 107. Intruding through the slit at the support region of the shroud, the guide 107 presents a fin 108 to which the rear end of the flexible needle 101 is secured. The rear end of the tube or shroud 106 is attached to one end of a coiled-band tension spring indicated diagrammatically at 109. At the forward pointing tip of the flexible needle 101 is a small head in which is provided an eye 110.

The twine 111 for tying the bale runs from the twine ball 112 at the top of the support 105 through the eye 110 of the flexible needle 101, under a guide roller 113, around the inside of the rear section of the bale chamber 14 (where it is held in position by the contents of the chamber) and over another guide roller or wheel 114 to the retainer in the knotter 115 indicated diagrammatically beneath the bale chamber.

FIG. 11b is a view in the direction AA, showing, first, the outer tubular guide 107 for the needle shroud 106 and, secondly, the fin 108 which intrudes into the shroud from below to support the rear end of the flexible needle 101.

In operation of the assembly, beginning from the situation shown in FIG. 11a where the chamber 14 is full of crop 116 and the carriage arms 18 have closed ready to compress the material, carriage 16 begins its advance towards the rear of the chamber 14 (i.e. to the right as viewed in the drawing) during which the funnel 102 at the top engages the tip of the needle 101 and guides it through 90° into the channel 104 provided by the upper compression arm. During the continued rearward movement of the carriage, the leading edge of the funnel 102 engages the shroud 106 over the flexible needle 101, pushing it rearwards through the guide 107 to extend the tension spring 109.

The tip of the needle 101 feeds progressively down the upper guide channel 104 and then bridges the small gap between opposing compression arm members 18 to enter the guide channel in the lower arm 18. This carries a small ramp in the exit region of the channel so as to deflect the head of the needle towards the knotter 115 at the end of the compression stroke (FIG. 11c). At this maximum compression situation, twine from the needle 101 and from around the bale (117) are both within reach of the twine-gripping bills of the knotter mechanism 115, whilst above the bale chamber 114, the needle shroud 106 is now fully deflected to the rear of the support 105 and the tension spring 109 is fully extended.

Turning now to the return motion of the carriage 16 (FIG. 11d), the flexible needle 101 soon withdraws from the lowermost guide channel 104 allowing the compression arms 18 to open forwardly as the carriage moves towards the original position of FIG. 11a. FIG. 11d shows an intermediate position in which the twine 111 lies at an angle across the bale chamber 14 between the twin retainers at the knotter 115 and the eye 110 of the needle 101.

As new crop 116 is forced rearwardly into the bale chamber 14 by the packer mechanism (not shown), the twine 111 is forced once again to surround the charge in the rear part of the chamber 14 and when the required pre-compaction density is reached, the compaction and tying cycles start anew.

Turning now to FIG. 12, this shows the twine guide system and an alternative flexible needle support arrangement 120 in which instead of sliding through a tubular guide 107, the needle shroud 106 is made to telescope into the guide (121) against the resistance of a coil spring 122. An advantage of this arrangement is that the shroud 106 can encompass the needle 101 completely, but disadvantages are that the overall length of the arrangement has to be much greater.

At the front of the needle shroud is a horizontal flange 123 wide enough to bridge across the twine guide funnel 102 which is attached to the upper part of the compression carriage 14. FIG. 12a is an end view looking along the line BB in FIG. 12.

In operation of the modified arrangement of FIGS. 12 and 12a, the head of the needle 101 is pushed further into the twine guide system 120 as the compression stroke takes place until, as before, it is channelled around the upper 90° bend provided by the funnel 102. From thence it passes across the short gap (this time via another small funnel 124 in the top arm member 18) into the recessed guide channels 104 behind the leading edges of the compression arms 18.

Throughout their length, the twine guides 103, 104 in this embodiment include slots which are open at their leading edges, the width of these slots being marginally wider than the diameter of the heaviest twine likely to be used.

Essentially the same bale-tying system may be used with a conventional baler as illustrated, by way of example, in FIGS. 13a to 13d.

Clearly, the items illustrated in FIGS. 11a to 13d comprise only one of a number of similar bale-tying assemblies spaced apart across the bale chamber.

Figure 13A:
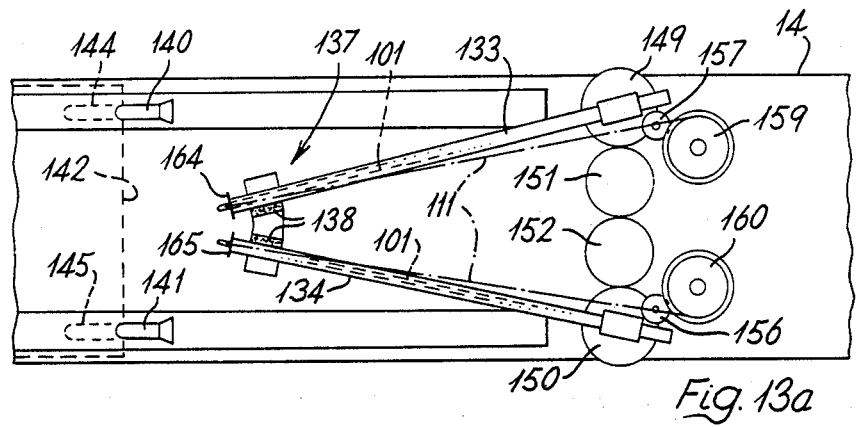
Figure 13B:
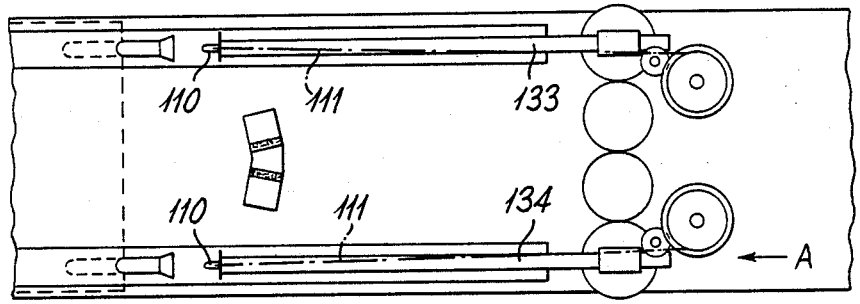
Figure 13C:
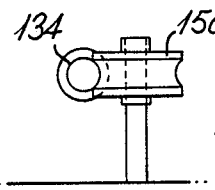
FIG. 13c is a view of a needle support guide arrangement taken along arrow A in FIG. 13b.

Referring now to FIGS. 13a and 13b, these show in plan view the top of the forward end of the chamber 14 of a reciprocating-piston baler in which two flexible twine needles 101 are surrounded by sliding support shrouds 133, 134 (or telescopic guides), as previously described.

The shrouds are pivoted about vertical posts (FIG. 13d) so that the tips of the needles can lie close to the centre line of the chamber. Each shroud 133, 134 is supported near its forward end on a pedestal 137 with sloping guide planes and resilient stops 138 on both sides.

Figure 13D:
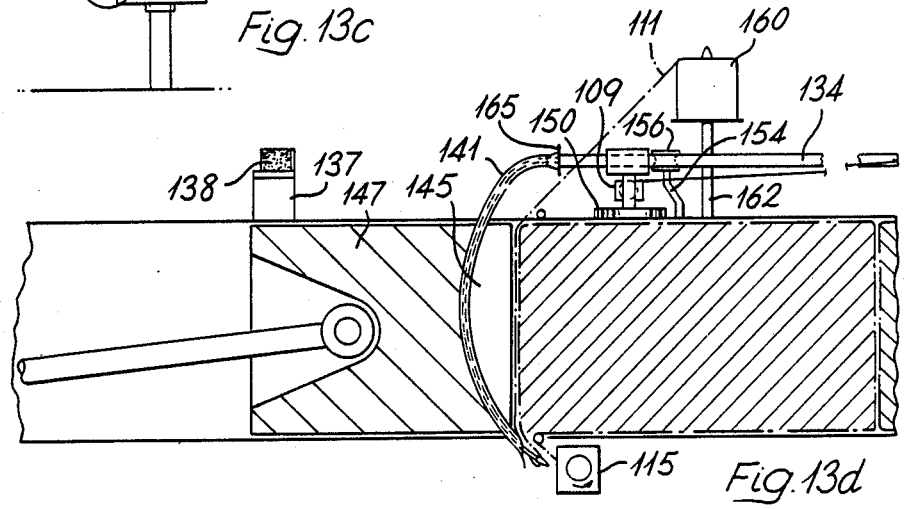

Forward of two funnel-ended twine guide ducts 140, 141 is shown in broken line 142 the crop-engaging front face of a reciprocating piston. Also in broken line are shown the continuation slots 144, 145 of the twine guide ducts 140, 141. As shown in FIG. 13d, the ducts curve downwardly through the front section of the piston (147).

Slots in the bale chamber cover allow the protruding portions of the twine guide system to move freely to and from with the piston.

At the base of the posts 136 supporting the flexible needle assemblies are gear wheels 149, 150 with a small number of gear teeth, and these are inter-connected by two more similarly designed gear wheels 151, 152. In place of wheels 149-152, discs may be used, if desired.

Behind the needle support posts 136 are two pillars 154 supporting pulleys 156, 157 with a curved face so positioned that they provide stops for the downstream ends of the needle shrouds. One such arrangement is shown on an enlarged scale in FIG. 13c.

Behind and above the posts 136 are shown, for illustration purposes only, cylindrical containers 159, 160 for twine, supported on stalks 162. In practice, it is more usual to provide a box into which can be placed several balls of twine at once, and these may be joined together to permit long periods of operation without having to replenish the twine. The twine box may be mounted at a lower level than shown, and this applies also to the twine needles and guide assemblies.

Before the last charge of crop is compressed, to complete the required length of the bale, the drive to the gear wheels is actuated, causing the needle assemblies to pivot outwardly so that they come to lie in the path of the feed duct funnels, as shown in FIG. 13b. The end sections of the sliding shrouds 133, 134 then engage the shaped rollers 156, 157 downstream of the pivot points. The rollers or supporting pedestals may have sliding adjustment to enable accurate alignment of the needle tips. Moreover, the rollers, or their outer annuli, may be made of resilient material.

FIG. 13d is a vertical section through the relevant part of the baler, showing the piston 147 approaching the end of its compression stroke. The funnels at the entrance to the twine guides 140, 141 have engaged locating discs 164, 165 of the needle shrouds 133, 134, forced each shroud to slide back against the tension exerted by its coil-band spring 109, and caused the flexible needle 101 to be fed downwards through the curved guide duct (141). The eye 110 of the needle is just approaching the knotter 115 and is about to place the second twine alongside the retained twine, so that both can be gripped and twisted by the knotter bills.

Because the twine guides 140, 141 lie at the end of a vertical recess in the leading section of the piston 147 and are open along their full length facing the bale, the twine can take the shortest path from the needle tips to the twine ball, namely around the end of the bale.

It should be noted that on some reciprocating-piston balers it will be more convenient to position the twine needle assemblies beneath the bale chamber 14 and the knotters and twine box on the top. This is current practice with the conventional tying system on the majority of balers.

As an alternative to the needle arrangement shown in FIGS. 13a to 13d, the needle and shroud supports may be offset horizontally from the pivots. As a further alternative to the horizontal pivoting of the needle assemblies, they may be pivoted in the vertical plane. As yet a further alternative, the needles may remain permanently in the operative position and the pick-up sections of the twine guides may be moved into temporary alignment with the needle assemblies by pivoting, rotating, bending or twisting. For this purpose the funnels and/or the 'neck' sections of the twine guides 140, 141 may be made from resilient materials. Whichever system is chosen, many ways of bringing needles and guide funnels into alignment are possible. Besides the driven system shown in FIGS. 13a to 13d, these also include spring-loading the needle assemblies in one direction and returning them by a small hydraulic or pneumatic ram acting directly on the assemblies or through a linkage, electric motor or solenoid actuation, and a mechanical trip linkage connected to the bale length material wheel or other means.

Advantages of the bale tying systems of FIGS. 11a to 13d are substantial simplification and cost savings by comparison with conventional systems, and the ability to increase the compression speed substantially because it will no longer be necessary to accelerate and decelerate the considerable mass of the needle yoke and needles in the span of one compression cycle.

We claim:

1. A mobile dead-ended crop baler comprising:
   means defining a bale chamber through which crop flows in one direction, said chamber including a downstream section having opposed side walls and opposed top and bottom walls, all of said walls extending generally parallel to said one direction, said bottom wall being split in said one direction into two base plates and said side walls being longitudinally hinged to said top wall and to adjacent ones of said two base plates;

means for compressing crop to be baled in said downstream section in said one direction; and means mounted at least one of said side walls and said bottom wall for movement outward of said section to expose a side and bottom surface of a compressed bale made in said section to facilitate the release of the bale from said section.

2. The baler defined in claim 1 including means mounting the other of the side walls for movement outward of the section.

3. A mobile dead-ended crop baler comprising:

means defining a bale chamber through which crop flows in one direction, said chamber including a downstream section having opposed side walls and opposed top and bottom walls, all of said walls extending generally parallel to said one direction;

means for compressing crop to be baled in said downstream section in said one direction;

means for binding a compressed bale with bindings extending continuously about the bale surfaces opposed to said top and bottom walls and the bale surfaces extending generally transversely of said one direction with the surfaces of the bale opposed to the side walls being free of bindings; and means mounting at least one of said side walls and said bottom wall for movement outward of said section to expose a side and bottom surfaces of a compressed bale made in said section to facilitate the release of the bale from said section, said bottom wall being rigidly connected with one of said side walls, the other of said side walls being rigidly connected with said top wall, and said one side wall being hinged to said top wall about an axis generally parallel to said one direction, whereby on outward movement of said one side wall, the bound bale is dumped out of said section onto the ground with a bindings-free surface of the bale lowermost so that said latter surface is in contact with the ground.

4. The baler defined in claim 3 wherein the section is of smaller dimension in the one direction than the height dimension of the side walls and the width dimensions of the top and bottom walls, whereby the bound surfaces of the bale are of greater area than those of the binding-free surfaces.

5. A mobile dead-ended crop baler comprising:

means defining a bale chamber through which crop flows in one direction, said chamber including a downstream section having opposed side walls and opposed top and bottom walls, all of said walls extending generally parallel to said one direction, said bottom wall being slit in said one direction into two base plates each rigidly connected to the adjacent side wall;

means for compressing crop to be baled in said downstream section in said one direction;

means for binding a compressed bale with bindings extending continuously about the bale surfaces opposed to said top and bottom walls and the bale surfaces extending generally transversely of said one direction with the surfaces of the bale opposed to said side walls being free of bindings; and means mounting said side walls and the base plates connected thereto for movement outward of said section to expose a side and bottom surfaces of a compressed bale made in said section to facilitate the release of the bale from said section.

6. The baler defined in claim 5 including:

means mounting the other of the side walls for movement outward of the section; and means connected to said side walls for moving them successively outward of said section, whereby a bound bale is dumped out of the section onto the ground with a bindings-free surface of the bale lowermost so that said latter surface is in contact with the ground.

7. The baler defined in claim 5 wherein the section is of smaller dimension in the one direction than the height dimension of the side walls, and the width dimensions of the top and bottom walls, whereby the bound surfaces of the bale are of greater area than those of the binding-free surfaces.

* * * * *